US009887897B2

(12) United States Patent
Chakarapani et al.

(10) Patent No.: US 9,887,897 B2
(45) Date of Patent: Feb. 6, 2018

(54) BITRATE SELECTION FOR NETWORK USAGE CONTROL

(71) Applicant: Verizon Patent and Licensing Inc., Arlington, VA (US)

(72) Inventors: Lakshmi Chakarapani, Irving, TX (US); Gaurav Rinwa, Irving, TX (US); Rahul Aurora Srinivasan, San Diego, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 407 days.

(21) Appl. No.: 14/256,869

(22) Filed: Apr. 18, 2014

(65) Prior Publication Data
US 2015/0304390 A1   Oct. 22, 2015

(51) Int. Cl.
| | |
|---|---|
| G06F 15/16 | (2006.01) |
| H04L 12/26 | (2006.01) |
| H04L 29/06 | (2006.01) |
| H04W 4/18 | (2009.01) |
| H04N 21/262 | (2011.01) |
| H04N 21/472 | (2011.01) |
| H04N 21/658 | (2011.01) |
| H04N 21/845 | (2011.01) |
| H04L 12/24 | (2006.01) |

(52) U.S. Cl.
CPC .............. *H04L 43/10* (2013.01); *H04L 43/50* (2013.01); *H04L 65/4069* (2013.01); *H04N 21/26258* (2013.01); *H04N 21/47202* (2013.01); *H04N 21/6581* (2013.01); *H04N 21/8456* (2013.01); *H04W 4/18* (2013.01); *H04L 41/5019* (2013.01)

(58) Field of Classification Search
CPC ................................ H04L 67/06; H04L 43/10
USPC .......... 709/217, 226, 231, 246; 725/101, 88, 725/109, 14; 455/405
See application file for complete search history.

(56) References Cited

U.S. PATENT DOCUMENTS

| | | | | |
|---|---|---|---|---|
| 8,510,555 | B2* | 8/2013 | Tam ............................. | 713/168 |
| 2005/0246751 | A1* | 11/2005 | Boyce ............. | H04N 21/23439 725/101 |
| 2006/0025148 | A1* | 2/2006 | Karaoguz ............. | H04H 20/57 455/452.2 |
| 2011/0151831 | A1* | 6/2011 | Pattabiraman ......... | H04L 12/14 455/405 |
| 2012/0263434 | A1* | 10/2012 | Wainner ................. | H04N 5/765 386/241 |
| 2012/0297430 | A1* | 11/2012 | Morgos ............... | H04L 65/4084 725/88 |
| 2013/0046857 | A1* | 2/2013 | Howe ................. | H04L 65/4069 709/219 |
| 2013/0072201 | A1* | 3/2013 | Nakamura ............ | H04W 16/08 455/445 |
| 2013/0077675 | A1* | 3/2013 | Rosen .................... | H04N 19/15 375/240.03 |
| 2014/0025710 | A1* | 1/2014 | Sarto ................... | G06F 17/3002 707/823 |
| 2015/0012928 | A1* | 1/2015 | Chen ................ | H04N 21/25866 725/14 |

* cited by examiner

*Primary Examiner* — Thuong Nguyen (57) ABSTRACT

A user device may receive bitrate availability information identifying one or more bitrates associated with content; receive, from a user of the user device, a selection of a particular bitrate of the one or more bitrates; request segment files associated with the particular bitrate; and receive the segment files.

20 Claims, 7 Drawing Sheets

BITRATE SELECTION FOR NETWORK USAGE CONTROL

BACKGROUND

User devices may receive content via adaptive bitrate techniques, in which the bitrate of the content, delivered to the user device, may vary based on network conditions. The user device may receive the content at the maximum bitrate that network conditions may allow (e.g., so that the content may be presented at the highest level of quality).

DETAILED DESCRIPTION OF THE PREFERRED EMBODIMENTS

The following detailed description refers to the accompanying drawings. The same reference numbers in different drawings may identify the same or similar elements.

User devices may receive content via adaptive bitrate techniques, in which the bitrate of the content, delivered to the user device, may vary based on network conditions. The user device may receive the content at the maximum bitrate that network conditions may allow (e.g., so that the content may be presented at the highest level of quality). In certain situations, however, it may be desirable to receive content at a bitrate that is lower than the maximum bitrate, in order to reduce network data usage of a user device. For example, network data usage of the user device may be metered and/or limited based on a service level agreement between a user of the user device and a network provider associated with a network via which content is delivered.

Systems and/or methods, as described herein, may permit a user of a user device to select a maximum bitrate of content delivered to the user device via the network. The selected maximum bitrate may be lower than an available maximum bitrate (e.g., a maximum bitrate permitted by network conditions). As a result, network data usage, by the user device, may be reduced in relation to network data usage when content is delivered at the available maximum bitrate.

Figure 1:
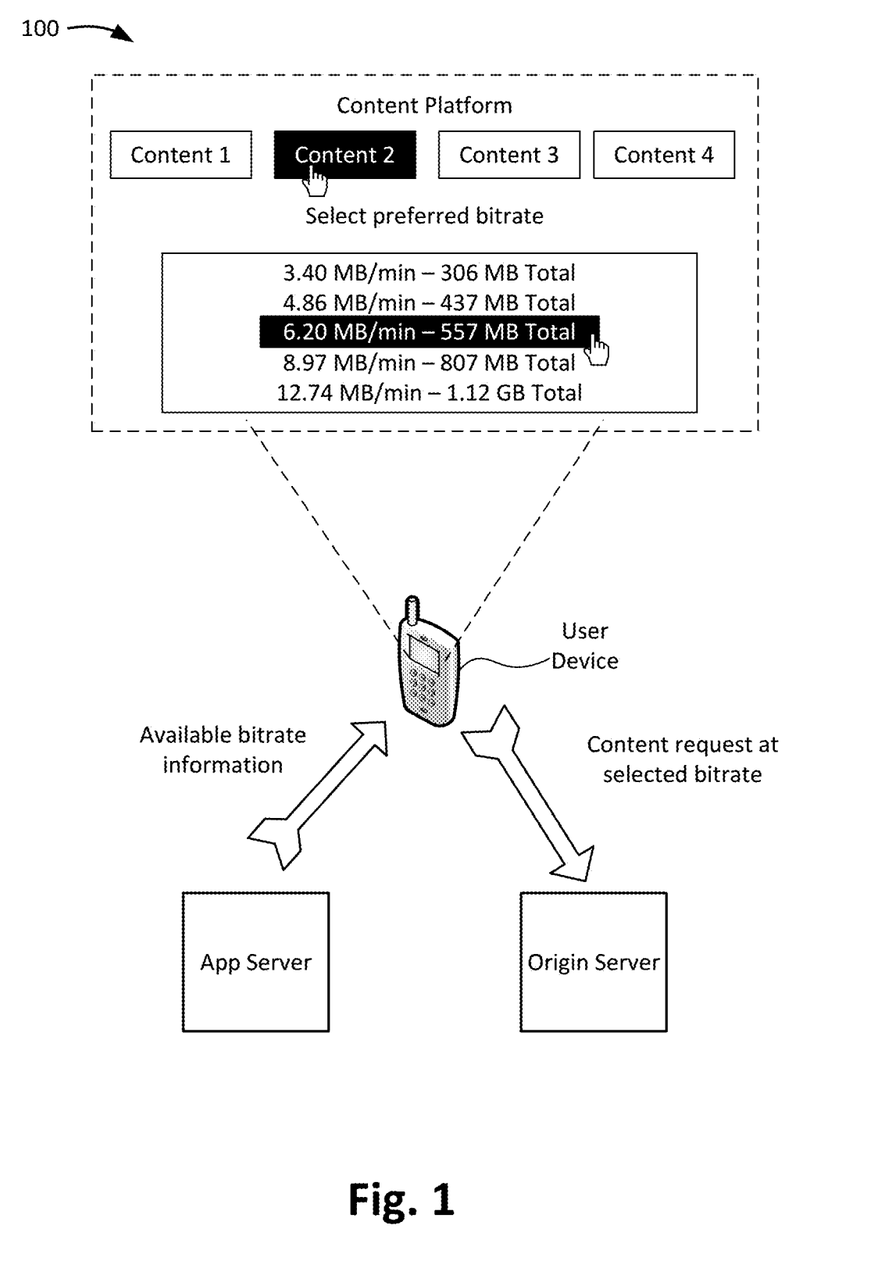
FIG. 1 illustrates an example overview of an implementation described herein.

FIG. 1 illustrates an example overview of an implementation described herein. As shown in FIG. 1, a user device may communicate with an application server (hereinafter referred to as an app server) in order to select content via a content platform (as shown in interface 100). For example, a user of the user device may select to open a content platform application, running on the user device, in order to select and receive content. When the user device receives a selection for particular content (e.g., content 2), the app server may provide information identifying available bitrates for the content.

Based on receiving the available bitrate information, the user device may determine the total amount of data usage (e.g., in megabytes, gigabytes, etc.) associated with each bitrate. The user device may display the available bitrate information and the total data usage associated with each bitrate. As shown in FIG. 1, a user may select a particular bitrate, and the user device (e.g., based on receiving the selection) may request, from an origin server, the segment files for the content at the selected bitrate. The origin server may then output the content at the selected bitrate. As network conditions vary, the user device may automatically request the content at lower bitrates. In some implementations, the user device may not request the content at higher bitrates than the selected bitrate. That is, even when higher bitrate content is available, the higher bitrate content may not be delivered to the user device. As a result, network data usage, by the user device, may be reduced in relation to when content is delivered at a bitrate higher than the selected maximum bitrate.

Figure 2:
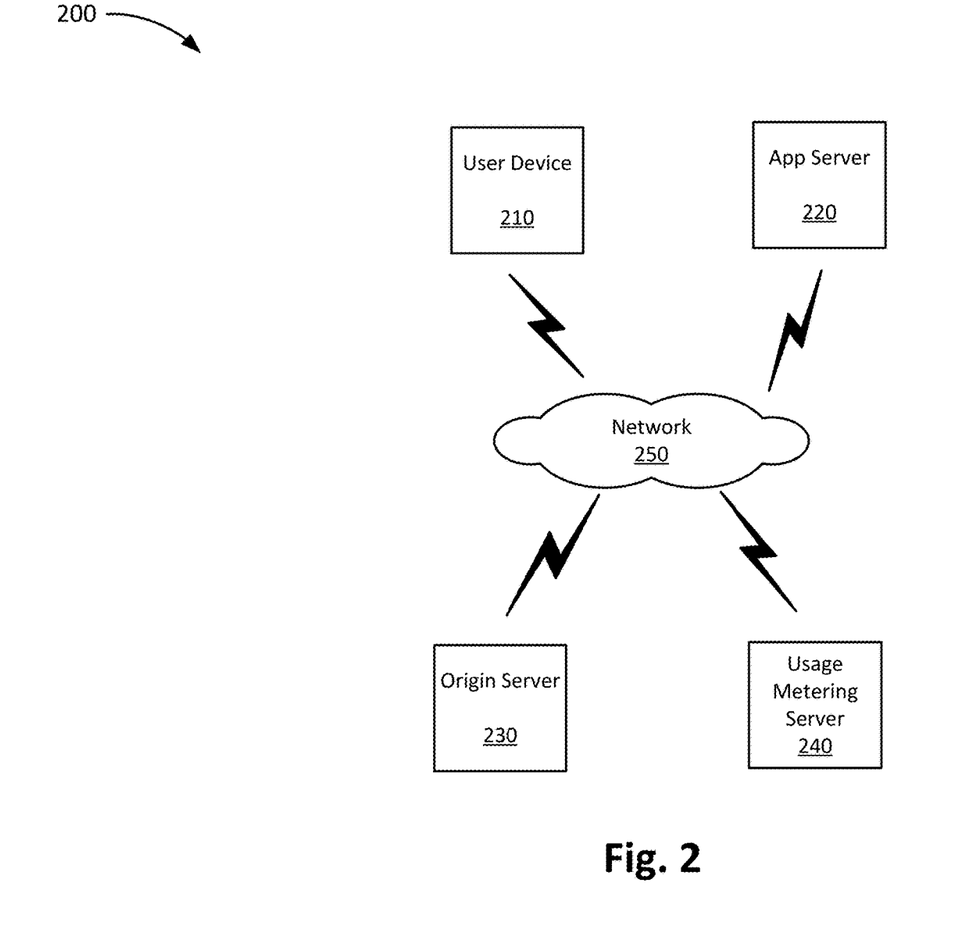
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, app server 220, origin server 230, usage metering server 240, and network 250.

User device 210 may include a device capable of communicating via a network, such as network 250. For example, user device 210 may correspond to a mobile communication device (e.g., a smart phone or a personal digital assistant (PDA)), a portable computer device (e.g., a laptop or a tablet computer), a desktop computing device, a gaming device, a set-top box, and/or some other type of computing device.

User device 210 may communicate with app server 220 in order to select content via a content platform. User device 210 may receive available bitrate information, determine an amount of network data usage for each bitrate, and present the available bitrate information and the amount of network data usage. In some implementations, user device 210 may receive and present information identifying an amount of network data usage remaining on a user's account (e.g., based on information stored by usage metering server 240). User device 210 may request and receive segment files of content from origin server 230. User device 210 may receive maximum bitrate selections from a user, and may not request segment files that exceed the selected maximum bitrate.

App server 220 may include one or more computing devices, such as a server device or a collection of server devices. In some implementations, app server 220 may communicate with user device 210 to facilitate content delivery to user device 210. App server 220 may store account and/or subscription information for users, and may authorize user device 210 to receive content based on user information (e.g., login information received via a content platform of user device 210). App server 220 may also store information regarding user content preferences, content viewing history, content watch lists, etc., and may output this information for display on user device 210. App server 220 may receive content selections from user device 210 and may output information identifying available bitrates for the selected content. For example, app server 220 may output playlists for each available bitrate, or may output a single playlist with multiple profiles for each available bitrate.

Origin server 230 may include one or more computing devices, such as a server device or a collection of server devices. Origin server 230 may store segment files for content (e.g., a set of segment files for each available bitrate). In some implementations, origin server 230 may store a playlist for particular content at each available bitrate. For example, origin server 230 may store a first playlist associated with the particular content identifying segment files associated with a first bitrate, a second playlist associated with the particular content identifying segment files associated with a second bitrate, a third playlist associated with the particular content identifying segment files associated with a third bitrate, and so on. Additionally, or alternatively, origin server 230 may store a single playlist for the particular content with a profile for each available bitrate. For example, the single playlist may include a first profile identifying segment files associated with a first bitrate, a second profile identifying segment files associated with a second bitrate, a third profile identifying segment files associated with a third bitrate, and so on. The playlists and/or profiles may include location identifiers for the segment files. User device 210 may request, from origin server 230 using the location identifiers, segment files associated with particular bitrates, based on network conditions and a maximum selected bitrate.

Usage metering server 240 may include one or more computing devices, such as a server device or a collection of server devices. Usage metering server 240 may meter network data usage of user device 210. For example, usage metering server 240 may track an amount of data (e.g., in bytes, kilobytes, megabytes, gigabytes, etc.) transferred to and/or from user device 210 via a service provider network. The network data usage may include usage information regarding data transferred to and/or from user device 210 when origin server 230 provides segment files to user device 210. Usage metering server 240 may store remaining data usage information identifying an amount of data usage remaining in a particular time period (e.g., a billing cycle). Usage metering server 240 may output (e.g., to user device 210 and/or app server 220), the remaining data usage information.

Network 250 may include one or more wired and/or wireless networks. For example, network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
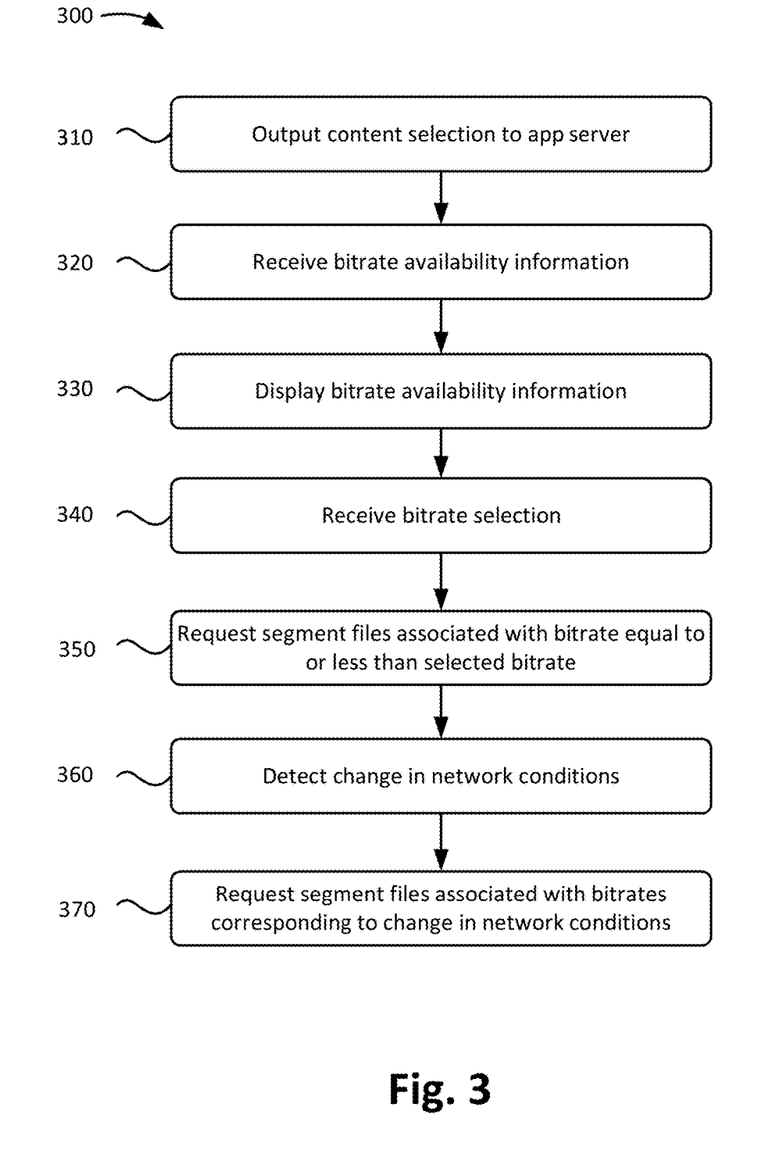
FIG. 3 illustrates a flowchart of an example process for requesting segment files associated with a bitrate equal to or less than a selected bitrate.

FIG. 3 illustrates a flowchart of an example process 300 for requesting segment files associated with a bitrate equal to or less than a selected bitrate. In some implementations, process 300 may be performed by user device 210. In some implementations, some or all of blocks of process 300 may be performed by one or more other devices. In FIG. 3, assume that a user of user device 210 has selected to open a content platform application used to select and receive content.

As shown in FIG. 3, process 300 may include outputting a content selection to an app server (block 310). For example, user device 210 may output a content selection to app server 220 based on receiving a selection for content from a user of user device 210 via the content platform application. The content selection may include an identifier of the selected content. Based on receiving the content selection, app server 220 may identify the content, and output bitrate availability information. For example, app server 220 may output a playlist for each bitrate associated with the content. Alternatively, app server 220 may output a single playlist with a profile for each bitrate associated with the content.

Process 300 may also include receiving bitrate availability information (block 320). For example, user device 210 may receive the bitrate availability information from app server 220 based on outputting the content selection to app server 220. As described above, user device 210 may receive the bitrate availability information in the form of a single playlist with a profile for each available bitrate. Alternatively, user device 210 may receive the bitrate availability information in the form of multiple playlists (e.g., a playlist for each available bitrate associated with the content).

The playlist for a particular bitrate may include a single profile associated with the particular bitrate. Alternatively, the playlist for a particular bitrate may include a profile associated with the particular bitrate, in addition to a profile for each bitrate less than the particular bitrate. For example, the playlist for the lowest available bitrate (e.g., bitrate 1) may include a single profile identifying segment files associated with bitrate 1. The playlist for the second lowest available bitrate (e.g., bitrate 2), may include a profile identifying segment files associated with bitrate 2 and, a profile identifying segment files associated with bitrate 1. Similarly, playlist for the third lowest available bitrate (e.g., bitrate 3), may include a profile identifying segment files associated with bitrate 3, a profile identifying segment files associated with bitrate 3, and a profile identifying segment files associated with bitrate 1. Alternatively, each playlist for each bitrate may include a single profile identifying segment files associated with the bitrate associated with the playlist. In some implementations, the bitrate availability information may identify the available bitrates for the content in units of kilobits per second (Kbps), megabits per second (Mbps), megabytes per minute (MB/min), and/or in some other unit.

Process 300 may also include displaying the bitrate availability information. For example, user device 210 may display the bitrate availability information via, for example, a user interface associated with the content platform application. For example, user device 210 may display the bitrate availability information as a list of bitrates in the example units described above. In some implementations, user device 210 may display the bitrate availability information as a list of resolutions associated with each bitrate (e.g., a 1920× 1080 resolution, a 640×480 resolution, etc.). Additionally, or alternatively, user device 210 may display the bitrate availability information as a list of descriptions associated with each bitrate (e.g., a Standard-Definition resolution, a High-Definition resolution, a Super High-Definition resolution, etc.).

In some implementations, user device 210 may display remaining data usage information for the user. For example, user device 210 may receive the remaining data usage information from usage metering server 240. Alternatively, app server 220 may receive the remaining data usage from usage metering server 240, and may provide the remaining data usage information to user device 210 when providing the bitrate availability information.

Process 300 may further include receiving a bitrate selection (block 340). For example, user device 210 may receive a bitrate selection from the user via the content platform application. In some implementations, the bitrate selection may identify a maximum bitrate for segment files, associated with the content, that user device 210 may request from origin server 230.

Process 300 may also include requesting segment files associated with a bitrate equal to or less than the selected bitrate (block 350). For example, user device 210 may request segment files associated with a bitrate equal to or less than the selected bitrate. As described above, user device 210 may request the segment files via a location identifier included in the playlist or in the profile associated with the requested bitrate. In some implementations, user device 210 may request segment files associated with the bitrate equal to the selected bitrate when network conditions support the delivery and playback of the segment files (e.g., when the segment files may be delivered and played back by user device 210 without lag and/or in accordance with a performance standard). User device 210 may request segment files associated with a bitrate less than the selected bitrate if network conditions are unable to support the delivery and playback of the segment files associated with the selected bitrate.

Process 300 may further include detecting a change in network conditions (block 360). For example, user device 210 may detect a change in the network conditions from when segment files were previously requested (e.g., as described above with respect to process block 350). In some implementations, user device 210 may detect that network conditions have improved, or that network conditions have degraded. In some implementations, user device 210 may detect that network conditions have changed based on a playback buffer of content. Additionally, or alternatively, user device 210 may detect that network conditions have changed based on network performance information received from an external source. Additionally, or alternatively, user device 210 may detect that network conditions have changed based on periodically or intermittently performing a throughput latency test.

Process 300 may also include requesting segment files corresponding bitrates corresponding to change in network conditions (block 370). For example, user device 210 may request segment files at bitrates corresponding to the change in network conditions. As an example, user device 210 may request segment files having a higher bitrate (e.g., up to the selected bitrate) than those segment files previously received if network conditions have improved. As another example, user device 210 may request segment files having a lower bitrate than those segment files previously received if network conditions have degraded.

As network conditions vary, user device 210 may request segment files associated with a bitrate of equal to or less than the selected bitrate. As a result, network data usage, by user device 210, may be reduced in relation to when content is delivered at an available maximum bitrate (e.g., a maximum bitrate permitted by network conditions and higher than the selected bitrate).

While process 300 is described in terms of receiving a maximum bitrate selection and requesting segment files with bitrates equal to or less than the selected bitrate, in practice, process 300 may apply for selecting a minimum bitrate and requesting segment files with bitrates equal to or greater than the selected bitrate. For example, a user of user device 210 may select to receive content at a particular minimum bitrate in exchange for additional buffering time.

Figure 4:
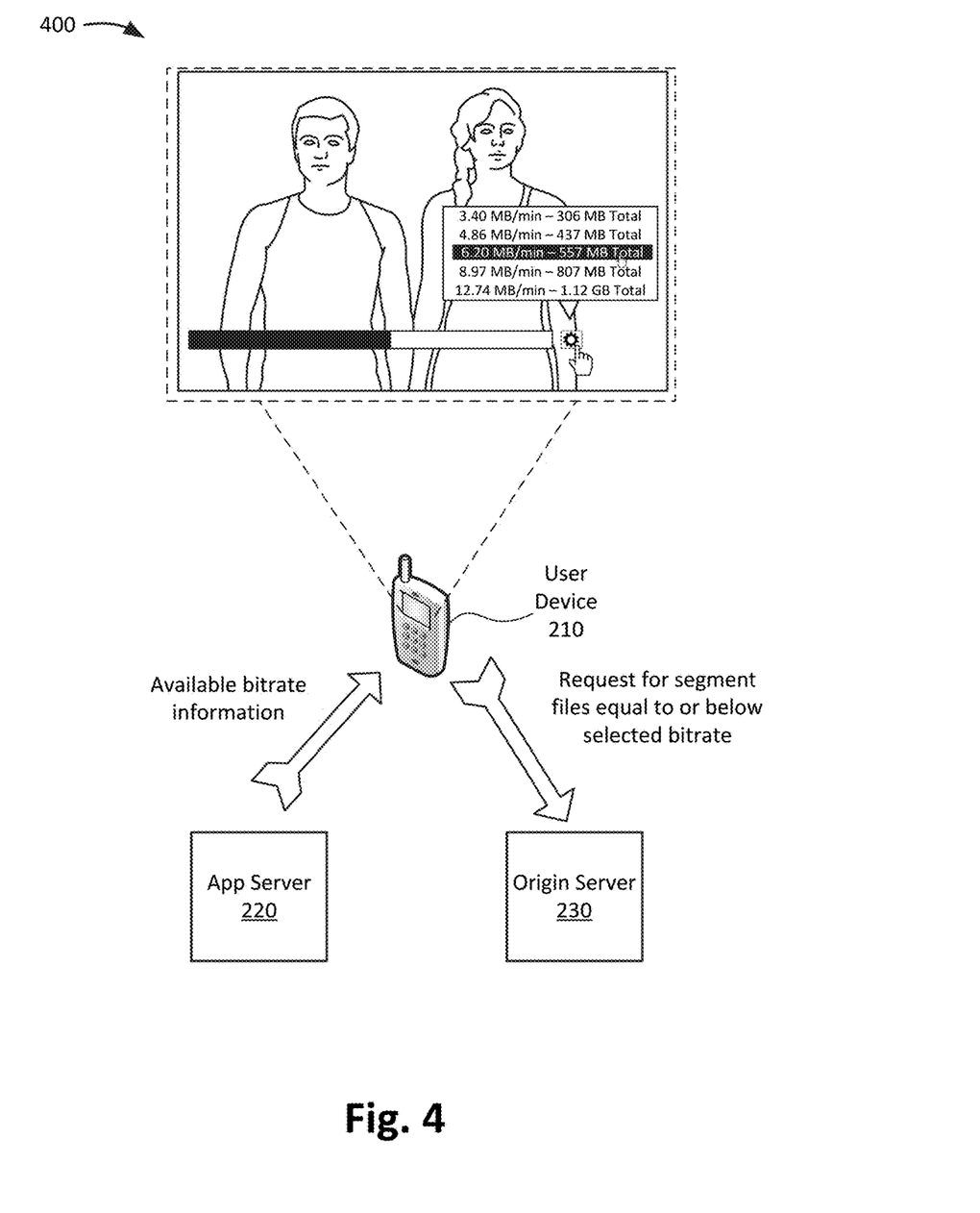
FIGS. 4-6 illustrate example implementations for delivering, to a user device, segment files associated with a bitrate equal to or less than a selected bitrate.
Figure 5:
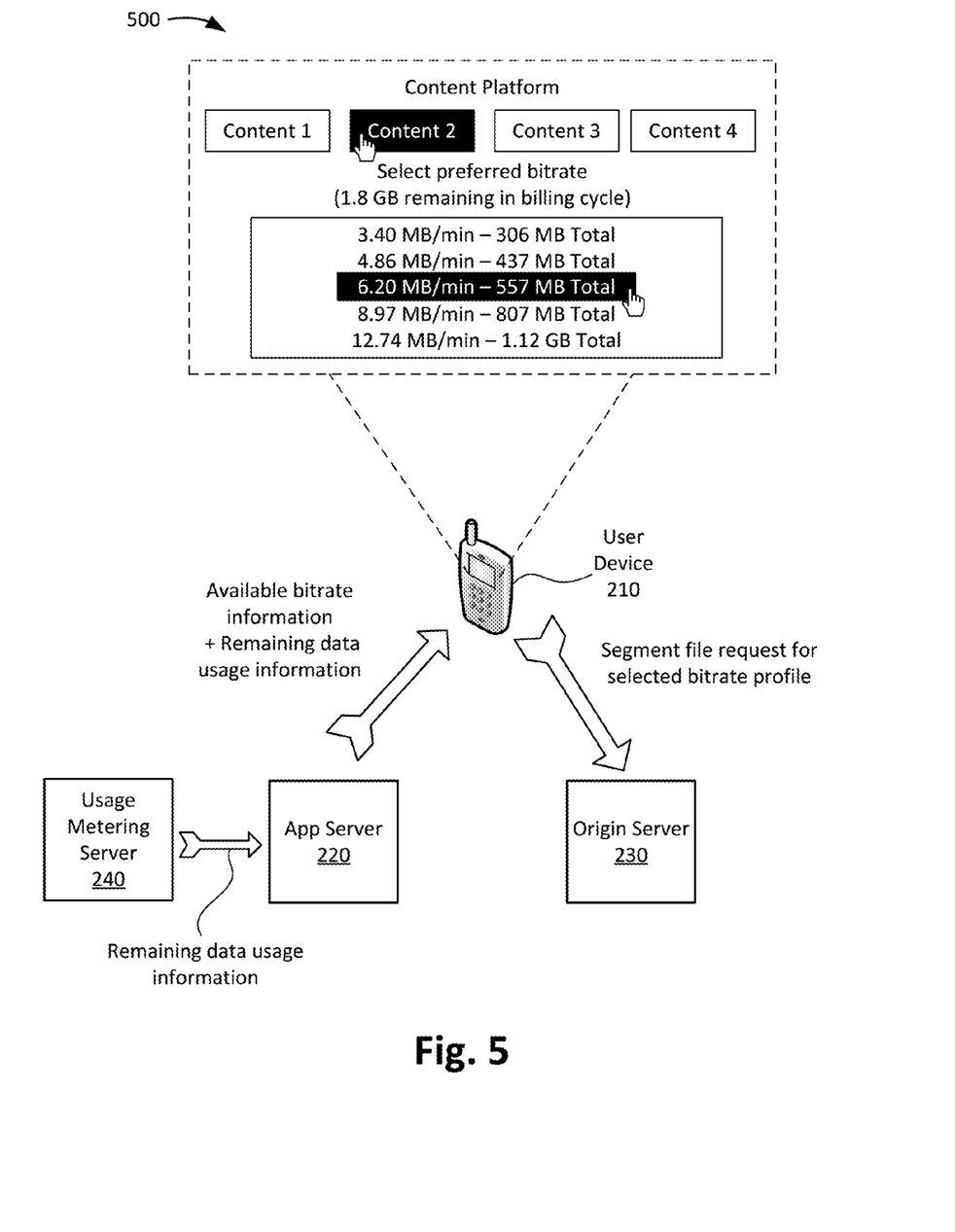
Figure 6:
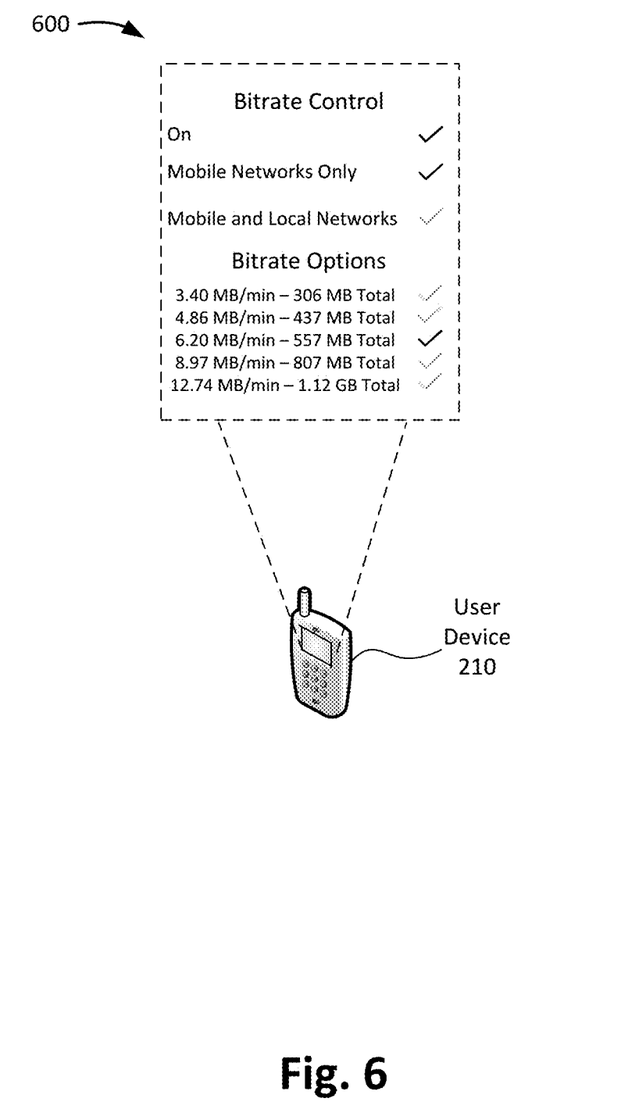

FIGS. 4-6 illustrate example implementations for delivering, to a user device, segment files associated with a bitrate equal to or less than a selected bitrate. Referring to FIG. 4, user device 210 may play back segment files for content received from origin server 230 (e.g., in response to a selection from a user to receive the content). During playback of the content, the user may select to change the maximum bitrate. For example, as shown in interface 400, the user may select an options or settings icon from within a playback viewer to select a maximum bitrate from a list of available bitrates (e.g., corresponding to available bitrate information from app server 220). In some implementations, the available bitrate information may be displayed in some other format than shown in FIG. 4. For example, the available bitrate information may be displayed as a resolution (e.g., a 1920×1080 resolution). Additionally, or alternatively, the available bitrate information may be displayed as a description (e.g., a Standard-Definition resolution, a High-Definition resolution, a Super High-Definition resolution, etc.).

Referring to FIG. 5, app server 220 may receive remaining data usage information from usage metering server 240. For example, when user device 210 executes a content application program, user device 210 may output information identifying the user to app server 220 (e.g., so that app server 220 may authenticate the user and output information regarding content services for display on user device 210). App server 220 may query usage metering server 240 for remaining data usage information associated with the user based on the user information. Usage metering server 240 may provide the remaining data usage information, and app server 220 may provide the remaining data usage information to user device 210. App server 220 may also provide available bitrate information to user device 210 when user device 210 receives a selection for particular content. As shown in interface 500, user device 210 may display the remaining data usage information along with the available bitrate information so that the user may determine a desired bitrate based on their remaining data usage amount.

Referring to FIG. 6, a content platform application may include options to activate and deactivate bitrate control (e.g., as shown in interface 600). For example, when the bitrate control is active, user device 210 may present the bitrate options to the user via the content platform application. In some implementations, user device 210 may present options to activate the bitrate control based on a network type via which user device 210 receives content. For example, user device 210 may present an option to activate the bitrate control when user device 210 is connected to a mobile network (e.g., a cellular network), but not when user device 210 is connected to a local network (e.g., a home or office network that may not have a data usage limit). When the bitrate control is user device 210 may present options for a user to preselect a maximum bitrate so that the user may not need to select the maximum bitrate each time content is selected. If the preselected bitrate is not available for particular content, user device 210 may prompt the user to select a bitrate, or may automatically select a lower bitrate than the preselected bitrate.

While particular examples are shown in FIGS. 4-6, the above description are merely example implementations. In practice, other examples are possible from what is described above with respect to FIGS. 4-6.

Figure 7:
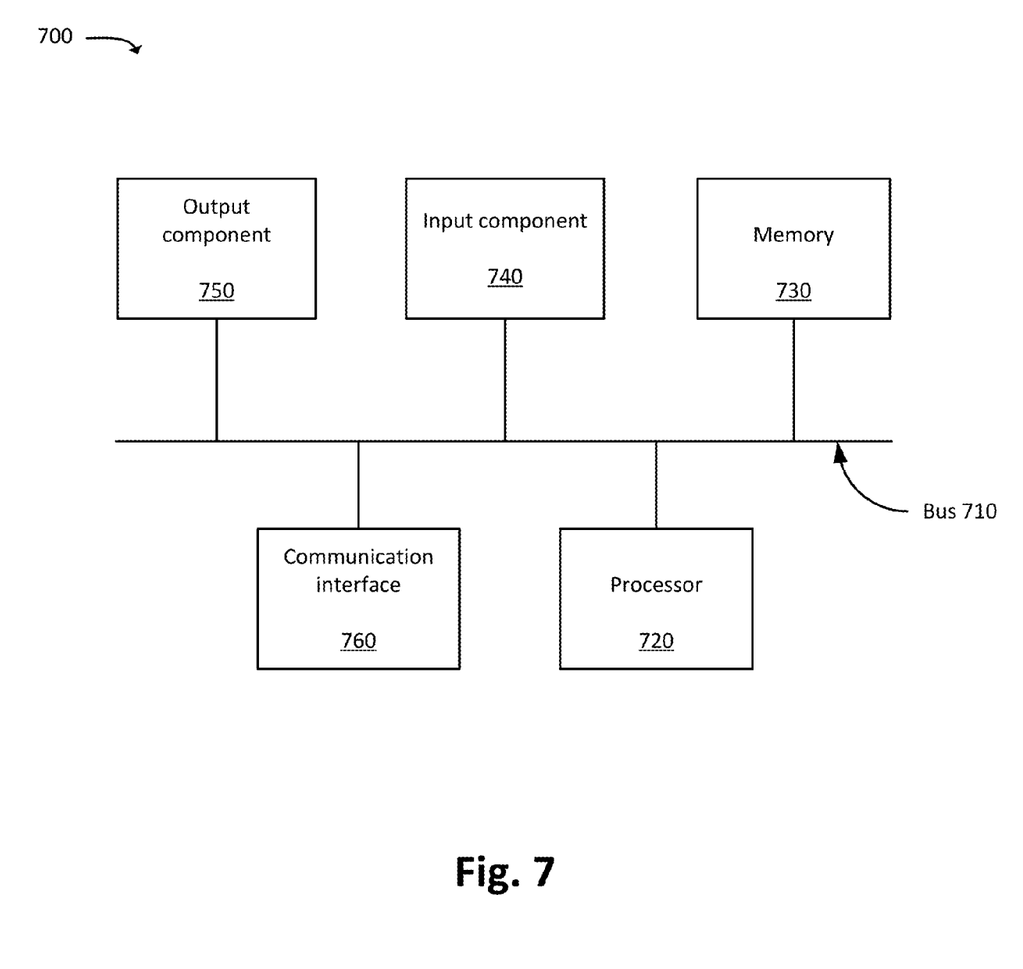
FIG. 7 illustrates example components of one or more devices, according to one or more implementations described herein.

FIG. 7 example components of one or more devices 700, according to one or more implementations described herein. One or more of the devices described above (e.g., with respect to FIGS. 1, 2, 4, 5, and 6) may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 3, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving, by a user device, bitrate availability information identifying a plurality of bitrates associated with particular content;
    displaying, via a display device of the user device, a plurality of selectable options corresponding to the plurality of bitrates, wherein displaying each selectable option, of the plurality of selectable options includes:
displaying, for each selectable option, of the plurality of selectable options, a bitrate that corresponds to each respective selectable option, and
displaying, for each selectable option, of the plurality of selectable options, a total amount of data usage associated with each bitrate that corresponds to each respective selectable option of the plurality of selectable options;
receiving, by the user device and from a user of the user device, a selection of a particular selectable option, of the plurality of selectable options, the particular selectable option corresponding to a particular bitrate of the plurality of bitrates for the particular content;
requesting, by the user device and based on the user selection of the particular selectable option, segment files associated with the selected particular bitrate for the particular content;
receiving, by the user device, the segment files associated with the selected particular bitrate; and
presenting, by the user device, the particular content by playing the received segment files.

2. The method of claim 1, wherein requesting the segment files includes requesting segment files associated with the particular bitrate or segment files associated with a bitrate less than the particular bitrate.

3. The method of claim 1, wherein the selected bitrate is a first bitrate, the method further comprising:
determining a second bitrate based on network conditions and the selection of the first bitrate,
the second bitrate being less than the first bitrate,
wherein requesting the segment files includes requesting the segment files associated with the second bitrate.

4. The method of claim 3, wherein the selection of the first bitrate is a user selection of a maximum bitrate at which the segment files are requested by the user device.

5. The method of claim 1, wherein the particular bitrate is a first bitrate, the method further comprising:
receiving, from the user, a selection for a second bitrate of the plurality of bitrates during playback of the content;
requesting segment files associated with the second bitrate; and
receiving the segment files associated with a bitrate equal to or less than the second bitrate.

6. The method of claim 1, further comprising:
displaying available data usage information that indicates an amount of network data usage remaining on an account associated with the user device,
wherein displaying the bitrate availability information includes displaying the available data usage information.

7. The method of claim 1, wherein the bitrate availability information includes:
corresponding playlists associated with each bitrate, of the plurality of bitrates,
wherein a particular corresponding playlist includes location identifiers of segment files associated with the bitrate of the particular corresponding playlist.

8. The method of claim 1, wherein requesting the segment files includes requesting segment files associated with a bitrate greater than the particular bitrate.

9. The method of claim 1, further comprising:
receiving a user preference indicating that when the user device is connected to a particular type of network, bitrate control should be enabled; and
determining that the user device is connected to a network of the particular type,
wherein the displaying of the plurality of selectable options and the requesting of the segment files associated with the selected particular bitrate are performed based on determining that the user device is connected to the network of the particular type.

10. A user device, comprising:
a non-transitory memory device storing:
a plurality of processor-executable instructions; and
a processor configured to execute the processor-executable instructions, wherein executing the processor-executable instructions causes the processor to:
receive bitrate availability information identifying a plurality of bitrates associated with particular content;
display a plurality of selectable options corresponding to the plurality of bitrates, wherein displaying each selectable option, of the plurality of selectable options, includes:
displaying, for each selectable option, of the plurality of selectable options, a bitrate that corresponds to each respective selectable option, and
displaying, for each selectable option, of the plurality of selectable options, a total amount of data usage associated with each bitrate that corresponds to each respective selectable option of the plurality of selectable options;
receive, from a user of the user device, a selection of a particular selectable option, of the plurality of selectable options, the particular selectable option corresponding to a particular bitrate of the plurality of bitrates for the particular content;
request, based on the user selection of the particular selectable option, segment files associated with the selected particular bitrate for the particular content;
receive the segment files associated with the selected particular bitrate for the particular content; and
present the particular content by playing the received segment files.

11. The user device of claim 10, wherein executing the processor-executable instructions, to request the segment files, causes the processor to request segment files associated with the particular bitrate or segment files associated with a bitrate less than the particular bitrate.

12. The user device of claim 10, wherein the selected bitrate is a first bitrate, wherein executing the processor-executable instructions further causes the processor to:
determine a second bitrate based on network conditions and the selection of the first bitrate,
the second bitrate being equal to or less than the first bitrate,
wherein executing the processor-executable instructions, to request the segment files, causes the processor to request the segment files associated with the second bitrate.

13. The user device of claim 10, wherein the particular bitrate is a first bitrate, wherein executing the processor-executable instructions further causes the processor to:
receive, from the user, a selection for a second bitrate of the plurality of bitrates during playback of the content;
request segment files associated with the second bitrate; and
receive the segment files associated with a bitrate equal to or less than the second bitrate.

14. The user device of claim 10, wherein executing the processor-executable instructions further causes the processor to:
 display available data usage information that indicates an amount of network data usage remaining on an account associated with the user device,
 wherein executing the processor-executable instructions, to display the bitrate availability information, causes the processor to display the available data usage information.

15. The user device of claim 10, wherein the bitrate availability information includes:
 corresponding playlists associated with each bitrate, of the plurality of bitrates,
 wherein a particular corresponding playlist includes location identifiers of segment files associated with the bitrate of the particular corresponding playlist.

16. The user device of claim 10, wherein executing the processor-executable instructions, to request the segment files, causes the processor to request segment files associated with the particular bitrate or segment files associated with a bitrate greater than the particular bitrate.

17. The user device of claim 10, wherein executing the processor-executable instructions further causes the processor to:
 receive and store a user preference indicating that when the user device is connected to a particular type of network, bitrate control should be enabled; and
 determine that the user device is connected to a network of the particular type, indicated by the user preference,
 wherein the displaying of the plurality of selectable options and the requesting of the segment files associated with the selected particular bitrate are performed based on determining that the user device is connected to the network of the particular type.

18. A method comprising:
 displaying, by a user device, a first plurality of selectable options associated with a plurality of content items;
 receiving, by the user device and from a user, a selection of a first selectable option, of the first plurality of selectable options, the first selectable option being associated with a particular content item, of the plurality of content items;
 receiving, by the user device, bitrate information associated with the particular selected content item, the bitrate information indicating:
  a plurality of bitrates at which the content is available, and
  a total amount of data usage associated with each bitrate, of the plurality of bitrates;
 displaying, by the user device, the received bitrate information via a list that includes a second plurality of selectable options, wherein displaying each selectable option, of the second plurality of selectable options, includes:
  displaying, for each selectable option of the second plurality of selectable options, a particular bitrate, of the plurality of bitrates, that corresponds to each respective selectable option of the second plurality of selectable options, and
  displaying, for selectable option of the second plurality of selectable options, a the total amount of data usage associated with each respective selectable option of the second plurality of selectable options;
 receiving, by the user device and from the user, a selection of a second selectable option, of the second plurality of selectable options;
 determining, by a user device, a bitrate, out of the plurality of bitrates, based on:
  network conditions, and
  the selection of the second selectable option,
  the determined bitrate being equal to or less than the bitrate associated with the second selectable option; and
 requesting, by the user device, segment files associated with the determined bitrate.

19. The method of claim 18, further comprising:
 displaying available data usage information that indicates an amount of network data usage remaining on an account associated with the user device,
 wherein displaying the second plurality of selectable options includes displaying the available data usage information.

20. The method of claim 18, wherein the plurality of bitrates are associated with corresponding playlists associated with a particular playlist,
 wherein a particular corresponding playlist includes location identifiers of segment files associated with the bitrate of the particular corresponding playlist.

* * * * *